J. C. THOMPSON.
DUPLEX LIFT VALVE.
APPLICATION FILED OCT. 8, 1917.
1,319,437.
Patented Oct. 21, 1919.
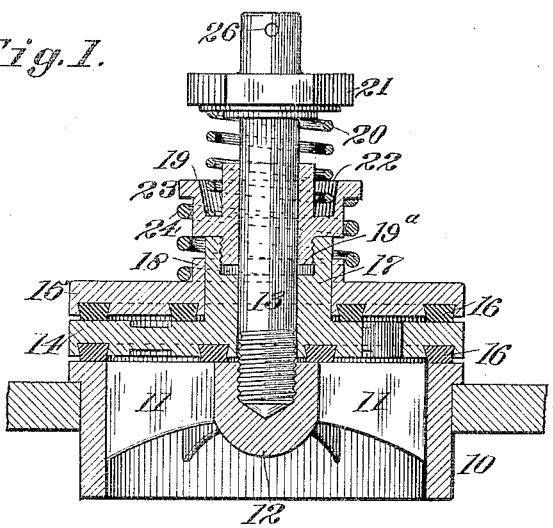
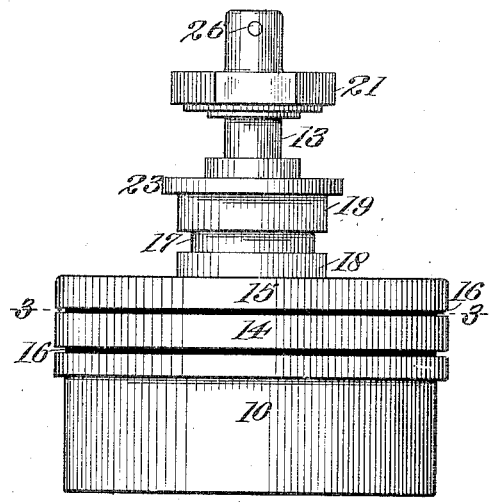
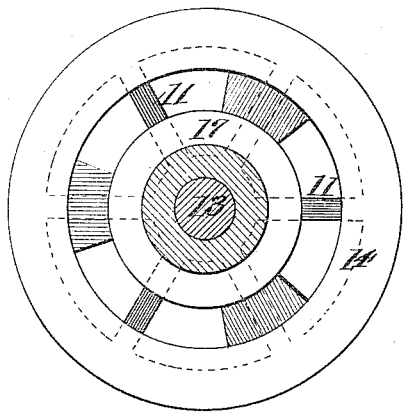
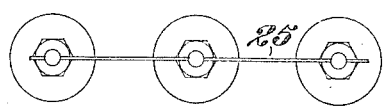
WITNESS:
Charles Pickles
Julius C. Benesch
INVENTOR.
John C. Thompson
BY
Strong & Townsend
ATTORNEYS.

UNITED STATES PATENT OFFICE.

JOHN C. THOMPSON, OF SAN FRANCISCO, CALIFORNIA.

DUPLEX LIFT-VALVE.

1,319,437. Specification of Letters Patent. Patented Oct. 21, 1919.

Application filed October 8, 1917. Serial No. 195,482.

*To all whom it may concern:*

Be it known that I, JOHN C. THOMPSON, a citizen of the United States, residing at the city and county of San Francisco and State of California, have invented new and useful Improvements in Duplex Lift-Valves, of which the following is a specification.

This invention relates to duplex lift valves of the type shown and described in my Patent No. 976,010, dated November 15th, 1910. The present invention has for its object to simplify and improve the construction and operation of such valves.

The valve, as shown in my patent above mentioned, has the springs for both valve plates seating against an overhead bar carried on an outside support. At times it is difficult to find proper anchorage for this overhead bar and also the valve plates should be guided in their vertical movement.

In the present invention I dispense with the overhead bar and substitute a central stud secured to the valve seat and extending upwardly through central apertures or bosses on the valve plates to form a guide for the latter, the springs for depressing the valve plates surrounding said stud and a novel and advantageous sliding collar being carried upon the stud to coöperate with said springs.

One form which my invention may assume is exemplified in the following description and illustrated in the accompanying drawings, in which—

Figure 1 shows a vertical, central, sectional view of a valve embodying my invention.

Fig. 2 shows a side elevation of the same with the springs removed.

Fig. 3 shows a sectional view taken on the line 3—3 of Fig. 2.

Fig. 4 shows a plurality of valves embodying my invention arranged side by side with a wire or rod extending through an aperture in each of the studs to prevent backward turning of the latter where a screw-threaded connection is formed between the stud and the seat.

The valve in its present form has a seat 10 of any desired size, shape or construction, provided with radial vanes 11 forming a spider, which at its center has a hub or enlargement 12 forming a screw-threaded seat for a stud bolt 13. Resting upon the valve seat is a ported valve plate 14 covering a portion of the passageway through said seat, and above the plate 14 is a second valve plate 15, preferably without ports and closing entirely the passageway through the seat. Where the valve plates seat they have rings 16 preferably formed of vulcanized rubber carried in dovetailed grooves.

The lower valve plate has an elongated boss or stem 17 fitting slidably around the bolt 13 and passing upwardly through a central aperture or short boss 18 upon the outside or upper plate. A collar 19, fitting slidably upon the bolt, normally rests upon the top of the boss 17 and is held depressed by means of an expansible coil spring 20 which abuts at its upper end against a flange or nut 21 on the stud bolt. A threaded stem 19ª on the collar screws into the boss 17 and forms a positive connection between the collar and the valve plate 14. This slidable collar 19 is formed with an annular channel 22 constituting a seat for the spring 20. Also the collar is provided with a projecting rim or flange 23, between which and the top of the upper plate 15 a second expansible coil spring 24 is arranged which preferably is somewhat stiffer than the first mentioned spring.

In operation, the suction or force applied to the valve plates raises first both plates together until the collar 19 strikes the flange or nut 21. This marks the limit of upward movement of the lower valve and thereafter the suction will act to raise the upper valve, compressing the spring 24 to a point where the short boss 18 thereon strikes the bottom of the collar 19. By changing the relative stiffness of the springs this order can be reversed so that the upper valve 15 will open before the lower valve starts to rise, in which case the collar 19 forms a positive stop for the upper valve plate.

Where a plurality of valves are employed in side by side arrangement I preferably run a wire or rod 25 through an aperture 26 formed in the upper end of each of the stud bolts, as shown in Fig. 4, to prevent backward turning of the bolts in their screw-threaded seats.

As a result of the changes and improvements herein shown and described a better control of the valve plates is obtained in that they are positively guided in their vertical movements and the springs have seats and guides which prevent their being deformed. Where before a long and a short spring were required, two short springs now serve the purpose. The upper spring, it will be noted, has a seat in the collar 19 which keeps it away from the stud bolt and prevents binding or undue wearing thereof.

Various changes in the construction and arrangement of the several parts herein shown and described may be made without departing from the spirit of my invention as disclosed in the appended claims.

Having thus described my invention, what I claim and desire to secure by Letters Patent is—

1. In a duplex lift valve having a seat and a pair of superposed valve plates, a guide bolt connected to the seat and extending upwardly through the plates, a boss on the lower plate, a boss on the upper plate surrounding said boss of the lower plate, a collar slidable on the bolt normally resting upon said boss of the lower plate and having a stem threaded into engagement with the interior of the boss of the lower plate, a nut on the upper end of the bolt, said collar having an annular channel forming a seat, a coil spring abutting the nut and arranged in said channel and on said seat, a rim projecting outwardly from the collar, and a second coil spring engaged with said rim and seating on the second plate and surrounding both bosses and the collar, said collar having a bottom portion which engages the boss of the upper valve and limits the lifting movement thereof relative to the lower valve.

2. In a duplex lift valve having a seat and a pair of superposed valve plates, a guide bolt connected to the seat and extending upwardly through the plates, a boss on the lower plate, a collar connected to the boss and having an outwardly extending abutment, a boss on the upper plate normally spaced from the bottom of the collar and having its lifting movement limited by engagement with the collar bottom, a coil spring between the upper plate and the collar abutment, an abutment on the bolt and a coil spring between the collar and the bolt abutment, the collar being engageable with the bolt abutment to limit the lifting movement of both plates relative to the seat.

3. In a duplex lift valve having a seat and a pair of superposed valve plates, a guide bolt connected to the seat and extending through the plates, a boss on the lower plate, a boss on the upper plate, means carried by the boss of the lower plate to engage the boss of the upper plate to limit the relative lifting of the upper plate with respect to the lower plate, a coil spring seating on the upper plate and engaging said means, an abutment on the bolt engageable with said means to limit the lifting movement of both plates relative to the seat, and a spring engaging the abutment and said means.

4. In a duplex lift valve having a seat and a pair of superposed valve plates, a guide bolt connected to the seat and extending through the plates, a boss on the lower plate, a boss on the upper plate, a spring for tensioning each plate, an abutment on the bolt and combined means carried by the boss of the lower plate to form a seat for the inner end of each spring and for engaging the boss of the upper plate to limit the relative lifting of the upper plate with respect to the lower plate, the other end of one spring seating on the upper plate and the other end of the other spring engaging the bolt abutment.

In testimony whereof I have hereunto set my hand in the presence of two subscribing witnesses.

JOHN C. THOMPSON.

Witnesses:
 JOHN H. HERRING,
 W. W. HEALEY.

Copies of this patent may be obtained for five cents each, by addressing the "Commissioner of Patents, Washington, D. C."